Aug. 20, 1929.  L. C. WETZEL  1,725,498
WEIGHING SCALE
Filed April 2, 1926
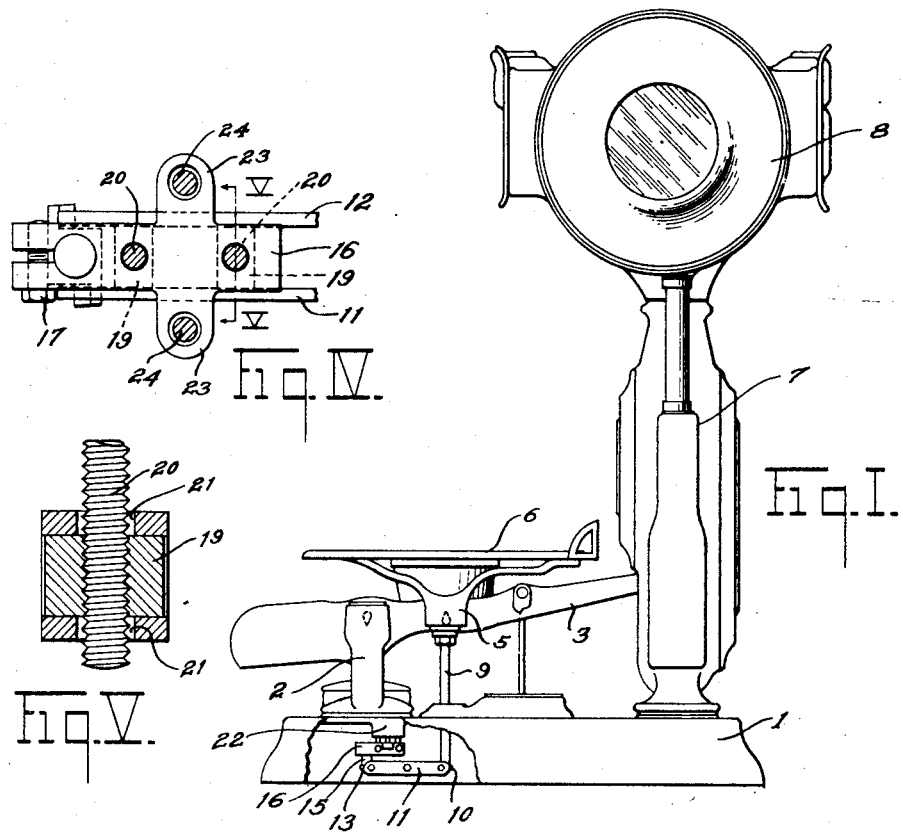
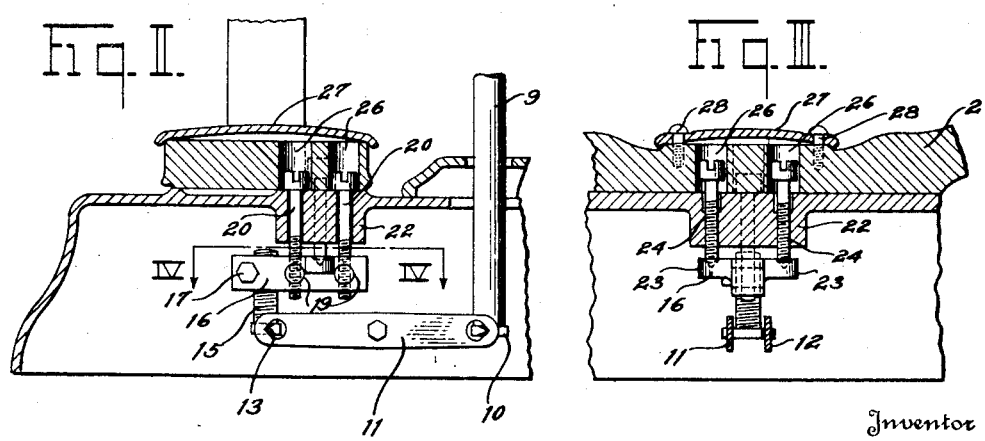
Inventor
Lewis C. Wetzel.
By Ed. Marshall
Attorney Patented Aug. 20, 1929.

1,725,498

UNITED STATES PATENT OFFICE.

LEWIS CALVIN WETZEL, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed April 2, 1926. Serial No. 99,255.

This invention relates to weighing scales, and more particularly to devices for maintaining the platform level throughout weighing movements.

In scales of the type having the commodity-receiving platform supported upon two bearing pivots carried by the scale beam it is necessary to employ a check link or stabilizing mechanism to prevent tilting of the platform when the load is placed adjacent the edges thereof and to secure the proper distribution of weight upon the scale beam so that an accurate weight of the commodity may be had irrespective of its position upon the platform. Delicate adjustment of the platform stabilizing mechanism is, therefore, necessary in order that it may function properly, and in the construction heretofore employed the scale must be moved from its support as the adjustments must be made in the base of the scale.

One of the principal objects of this invention is the provision of simple and effective means for adjusting the checking or platform stabilizing mechanism, which means is rendered easily accessible and may be manipulated without displacing the scale.

Another object of this invention is to provide a means whereby the platform checking mechanism may be readily adjusted without the use of special tools.

A further object is the provision of a universal means for mounting a check link element so that minute adjustments of this mechanism may be made very quickly and by unskilled mechanics.

Still another object is the provision of a means for adjusting the checking mechanism of a scale which may be locked in adjusted position and thereby prevent further derangement of the parts.

Other objects and advantages will be apparent from the following description, in which reference is had to the accompanying drawings illustrating a preferred embodiment of my invention and wherein similar reference numerals designate similar parts throughout the several views.

In the drawings:—

Figure I is an elevational view of a weighing scale embodying my invention;

Figure II is an enlarged vertical longitudinal sectional view through a portion of the base of the scale;

Figure III is a fragmentary vertical transverse sectional view through a portion of the base of the scale;

Figure IV is an enlarged fragmentary sectional view taken substantially on the line IV—IV of Figure II;

Figure V is an enlarged fragmentary detail sectional view taken substantially on the line V—V of Figure IV.

Referring to the drawings in detail, I have shown my invention by way of example as applied to a scale of the so-called cylinder type. However, it is to be understood that my invention is also applicable to other types of scales.

As the scale proper forms no part of the present invention, I will therefore describe it only in such detail as to show the connection of my invention therewith. The scale illustrated comprises a base 1 equipped at one end with the usual fulcrum support or base horn 2 upon which is fulcrumed the main lever 3 of the scale. The lever is also provided with load pivots suitably supporting a spider or platform support 5 surmounted by a suitable commodity-receiver or platform 6. The nose end of the lever 3 projects into an upright housing 7 erected upon the base 1 and is operatively connected to load-counterbalancing mechanism (not shown) supported within said housing and to indicating mechanism housed within the head 8 surmounting the upright housing 7.

In order to secure an accurate weighing scale it is necessary that the commodity-receiver or platform remain level at all times. To attain this result I have provided the spider 5 with a depending post 9 to the lower end of which is secured a double knife edge member 10 which is connected by means of a plurality of links 11 and 12 to a similar knife edge member 13 also secured to the lower extremity of a threaded vertical shaft 15, the links being so arranged as to form a push and pull connection between the knife edge members.

The threaded shaft 15 is adjustably secured in a substantially rectangular block 16 and may be locked in adjusted position by means of a screw 17. It is imperative in order to insure an accurate adjustment of the shaft 15 and knife edge member 13 that the block 16 supporting the shaft be capable of limited universal adjustment. To provide such an adjustment the block 16 is formed with two spaced transverse bores which are adapted to loosely receive cylindrical stud shafts 19, the latter having threaded openings adapted to receive the threaded portions of the screws 20. Clearance openings 21 are provided in the block 16 to permit a relatively slight oscillatory movement of the block relative to the screws 20. The block 16 is provided with laterally projecting ears 23, each ear being formed with a recess or depression adapted to receive the extremity of a screw 24. The screws 20 pass through clearance openings in a depending boss 22 of the base, while the screws 24 are threaded into openings in the boss 22. It will be at once apparent that by skillful manipulation of the screws 20 and 24 the post 15 and knife edge member 13 are rendered capable of limited universal adjustment so that the knife edges of the member 13 may be brought into accurate parallelogrammatic relation with the knife edges of the member 10 and the load and fulcrum pivots of the lever 3.

The base horn or fulcrum stand 2 is formed with a plurality of vertical bores or openings 26 to accommodate the heads of the screws 20 and 24. A cover plate 27 secured to the fulcrum stand 2 by means of screws 28 serves to cover the openings in the stand.

It will be obvious from the foregoing description that should adjustment of the check link mechanism be necessary the cover 27 may be removed and proper adjustment of the screws 20 and 24 may be made with an ordinary screw driver in a minimum length of time without displacing or otherwise deranging the scale.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a base, weighing mechanism including a load-receiving platform supported upon said base, stabilizing means for said platform supported within said base, and means accessible exteriorly of the base for universally adjusting said platform stabilizing means.

2. In a device of the class described, in combination, a base, weighing mechanism including a load-receiving platform supported upon said base, stabilizing means for said platform comprising relatively stationary and movable elements supported within said base, and means including a screw accessible exteriorly of said base for universally adjusting the relatively stationary element of said platform stabilizing means.

3. In a device of the class described, in combination, a base, weighing mechanism including a load-receiving platform, stabilizing means for said platform comprising relatively stationary and movable elements supported within said base, means including a link for operatively connecting said relatively stationary and movable members, and means comprising a plurality of screws accessible exteriorly of said base for imparting a limited universal adjustment to said relatively stationary member, said adjusting means being adapted to lock said member in adjusted position.

4. In a device of the class described, in combination, a frame, an adjustment block, and means for mounting said adjustment block on said frame for universal adjustment comprising cylindrical stud shafts rotatably mounted in said block, a pair of screws rotatably mounted in said frame and threaded into said shafts, and a pair of screws threaded in said frame and engaging said block.

5. In a device of the class described, in combination, a frame, an adjustment block, and means for mounting said adjustment block on said frame for universal adjustment comprising cylindrical stud shafts rotatably mounted in said block, a pair of screws rotatably mounted in said frame and threaded into said shafts, a pair of screws threaded in said frame and engaging said block, and a pivot secured to said block.

6. In a device of the class described, in combination, a frame, an adjustment block, means for mounting said adjustment block on said frame for universal adjustment, a shaft fixed in said block, means whereby said shaft may be rotatably adjusted therein, means for locking said shaft in adjusted position, and oppositely extending knife-edge pivots secured to said shaft.

7. In a device of the class described, in combination, a frame, an adjustment block, means for mounting said adjustment block on said frame, a threaded shaft engaging said adjustment block, means whereby said shaft may be rotatably adjusted in said block and for locking said shaft in adjusted position, and oppositely extending knife-edge pivots secured to said shaft.

8. In a device of the class described, in combination, a frame, an adjustment block, means for mounting said adjustment block on said frame for universal adjustment comprising cylindrical stud shafts rotatably mounted in said block, a pair of screws rotatably mounted in said frame and threaded into said shafts, a pair of screws threaded in said frame and engaging said block, a threaded shaft threaded into said block, means for locking said threaded shaft against rotation, and oppositely extending knife-edge pivots carried by said shaft.

LEWIS CALVIN WETZEL.